(12) United States Patent
Cuadra et al.

(10) Patent No.: US 6,449,175 B1
(45) Date of Patent: Sep. 10, 2002

(54) SWITCHED MAGAMP POST REGULATOR

(75) Inventors: Jason Cuadra, San Jose, CA (US); Manolo Mariano M. Melgarejo, Quizon (PH)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/637,421

(22) Filed: Aug. 11, 2000

(51) Int. Cl.$^7$ ................................................ H02M 7/04
(52) U.S. Cl. ......................................... 363/89; 323/251
(58) Field of Search ............................. 363/84, 89, 91, 363/93; 323/248, 251, 254, 261, 262, 263

(56) References Cited

U.S. PATENT DOCUMENTS

| | | | |
|---|---|---|---|
| 5,642,267 A | * | 6/1997 | Brkovic et al. ................ 363/16 |
| 6,038,150 A | * | 3/2000 | Yee et al. ...................... 363/89 |
| 6,147,476 A | * | 11/2000 | Rockenbach et al. ........ 323/254 |

OTHER PUBLICATIONS

Design of Hgh Frequency Mag Amp Regulators Using Metglas Amorphous Alloy 2714A, 1996 Allied Signal Application Guide.

Abraham Pressman, Switching Power Supply Design, McGraw–Hill, New York, 1991, Chapter 10 Magnetic–Amplifier Postregulators, pp. 381–411.

Keith Billings, Switchmode Power Supply Handbook, McGraw–Hill, New York, 1989, Chapter 21 High–Frequency Saturable Reactor Power Regulator (Magnetic Duty Ratio Control), pp. 2.174–2.189.

Paul Kotlarewsky, Beyond the Limitations of Reset Control and Square Loop Materials for Mag–Amp Post Regulators, HFPC Jun. 1991 Proceedings, pp. 129–139.

* cited by examiner

*Primary Examiner*—Adolf Deneke Berhane
(74) *Attorney, Agent, or Firm*—Coudert Brothers LLP

(57) ABSTRACT

A switched magamp post regulator in a power converter incorporating a switched set mode control circuit which minimizes the power loss associated with the control transistor of a set mode magamp post regulator is disclosed. Power loss in set mode is minimized by switching the control transistor on and off synchronously with the main transformer. The incorporation of set mode and switching allows the use of less expensive ferrite core materials with increased efficiency for operation at higher frequencies and higher temperatures.

28 Claims, 14 Drawing Sheets

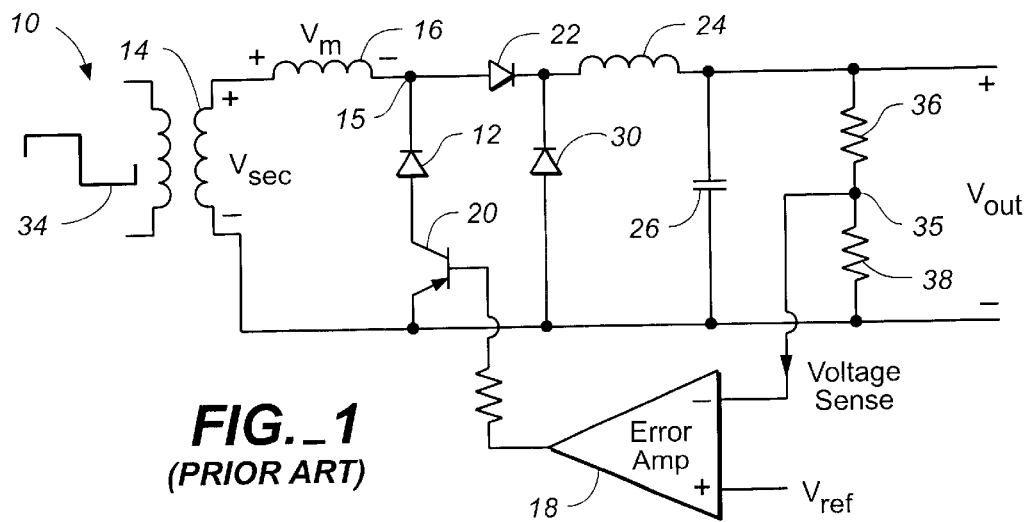
FIG._1
(PRIOR ART)
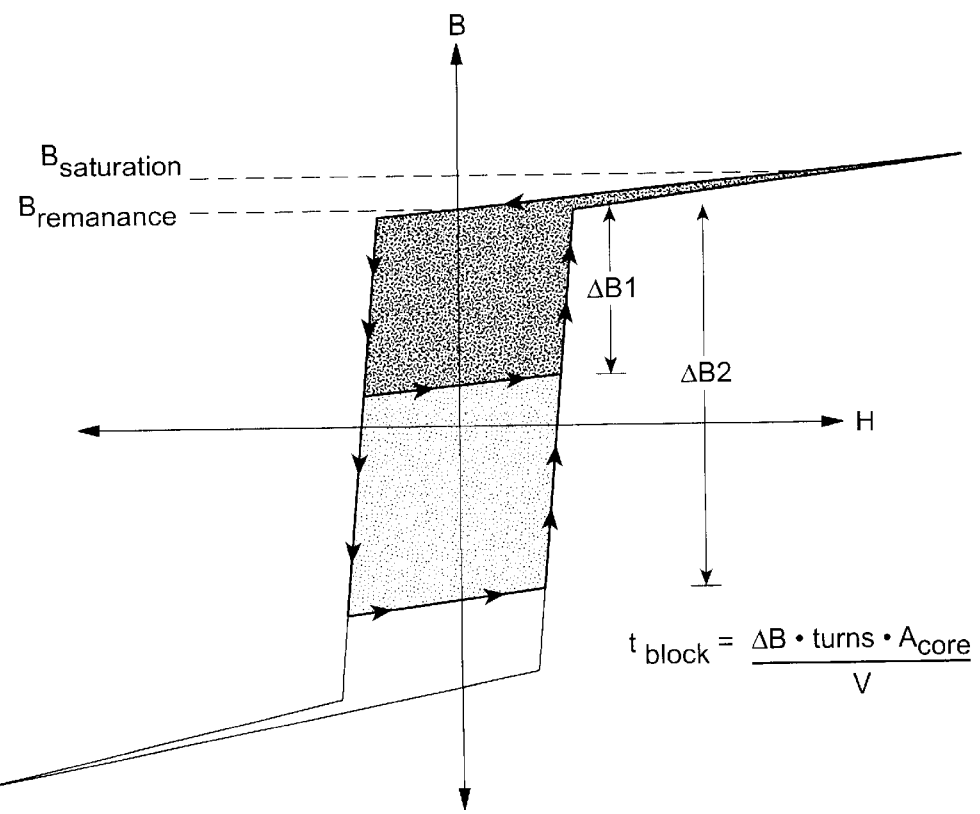
$$t_{block} = \frac{\Delta B \cdot turns \cdot A_{core}}{V}$$
FIG._2

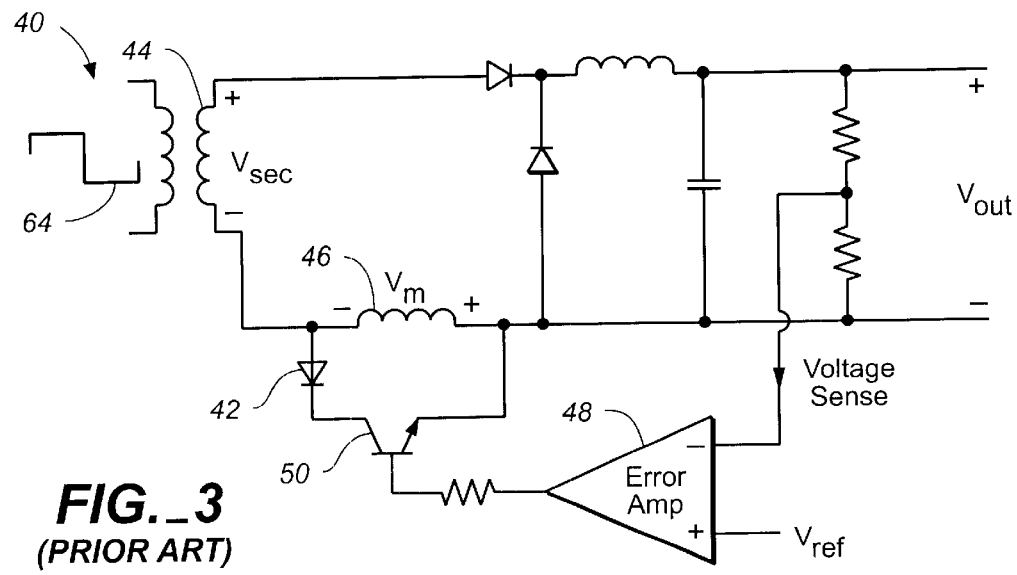
FIG._3
(PRIOR ART)
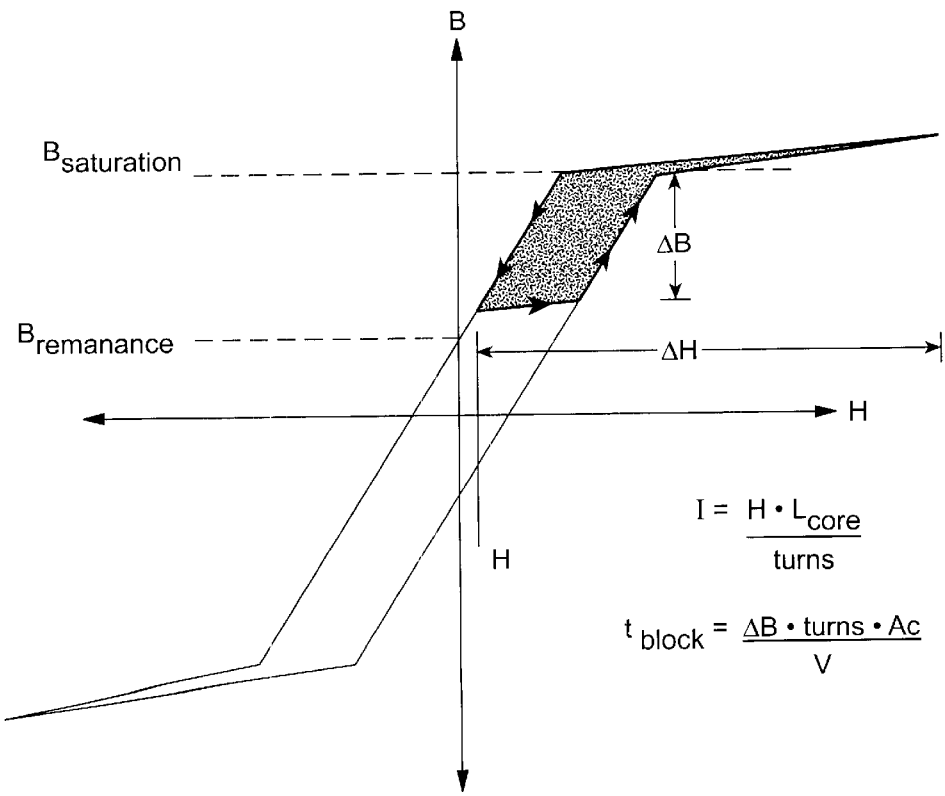
$$I = \frac{H \cdot L_{core}}{turns}$$
$$t_{block} = \frac{\Delta B \cdot turns \cdot A_c}{V}$$
FIG._4

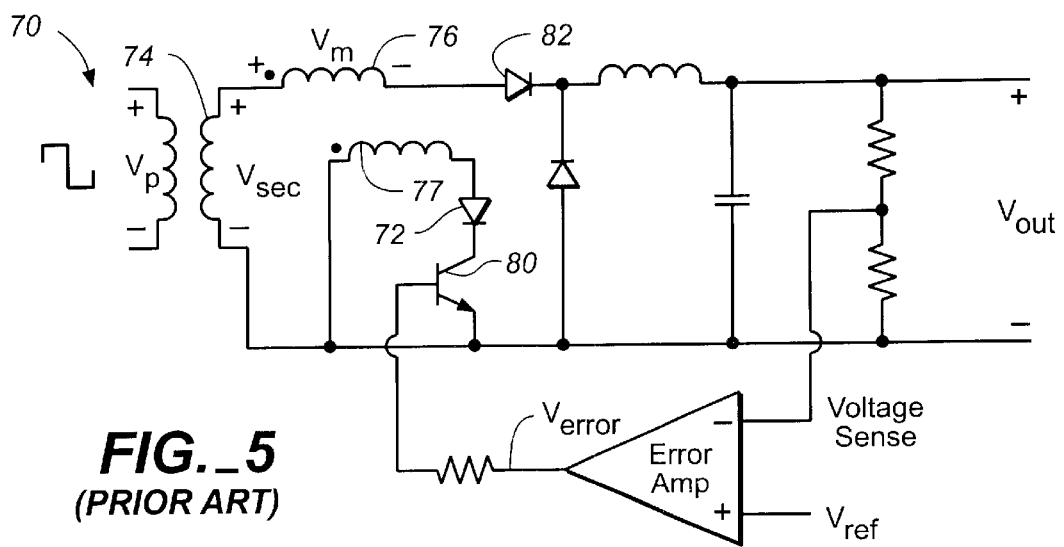
FIG._5
*(PRIOR ART)*
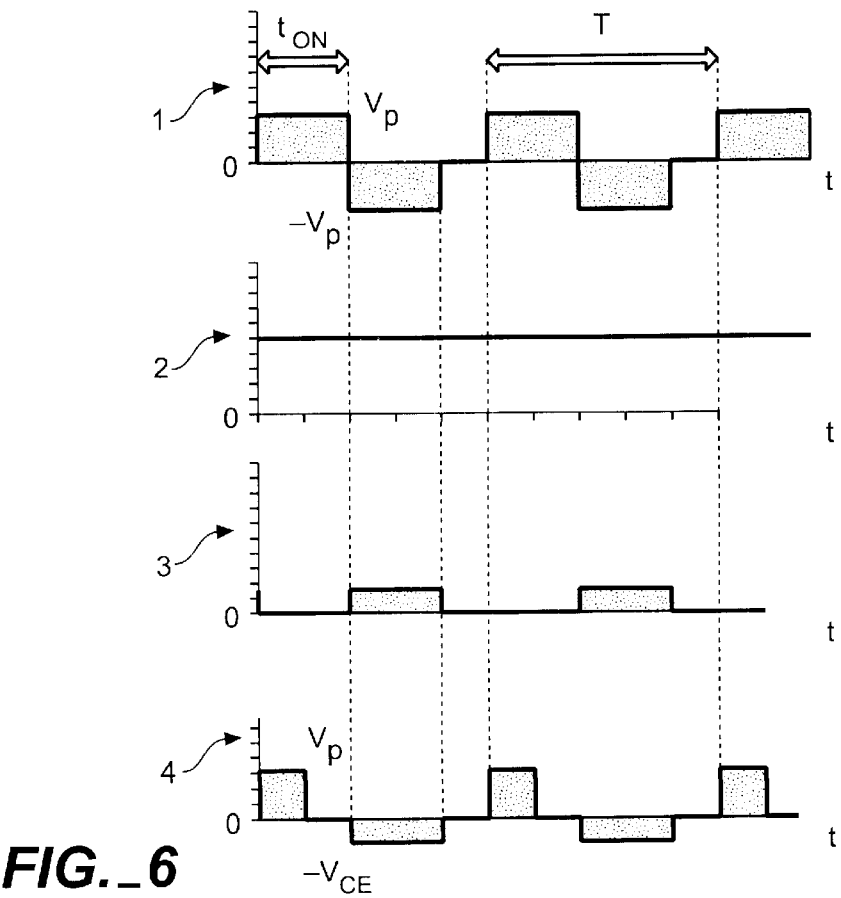
FIG._6

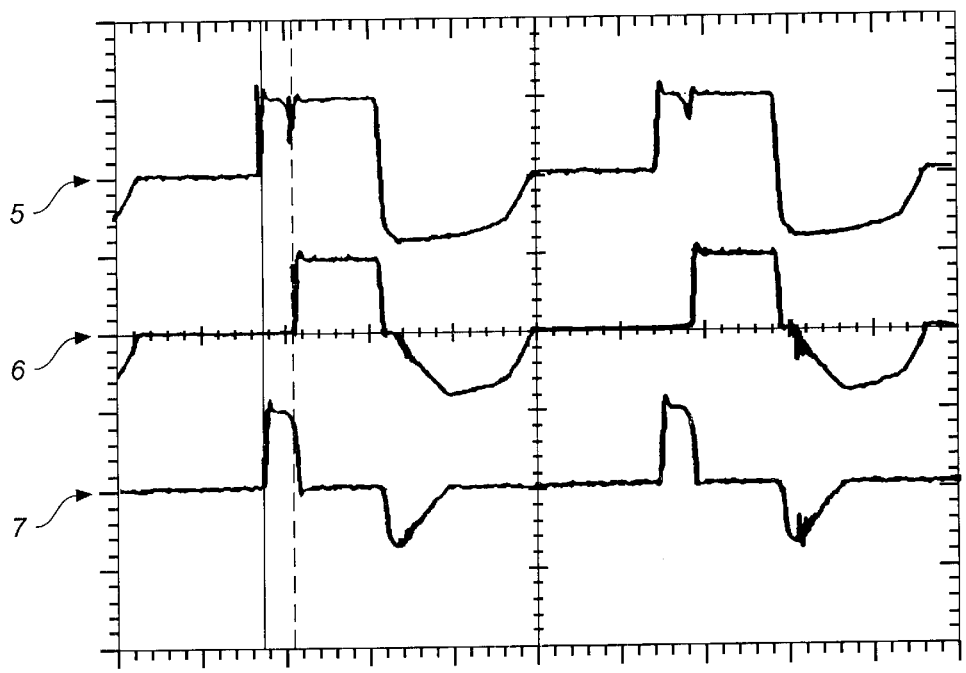
FIG._7
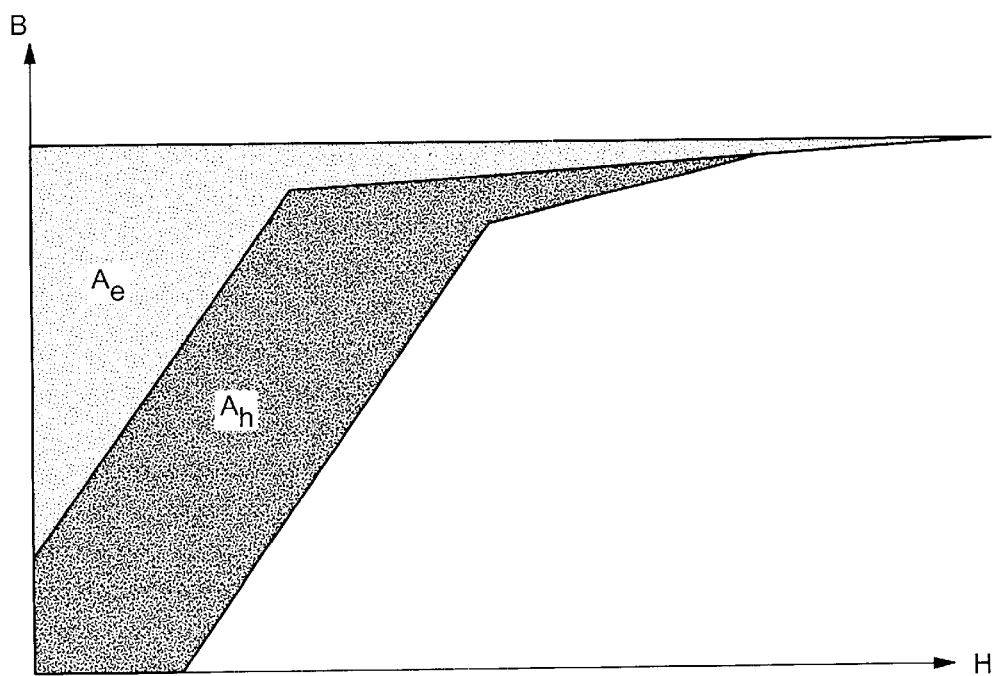
FIG._8

FIG._9

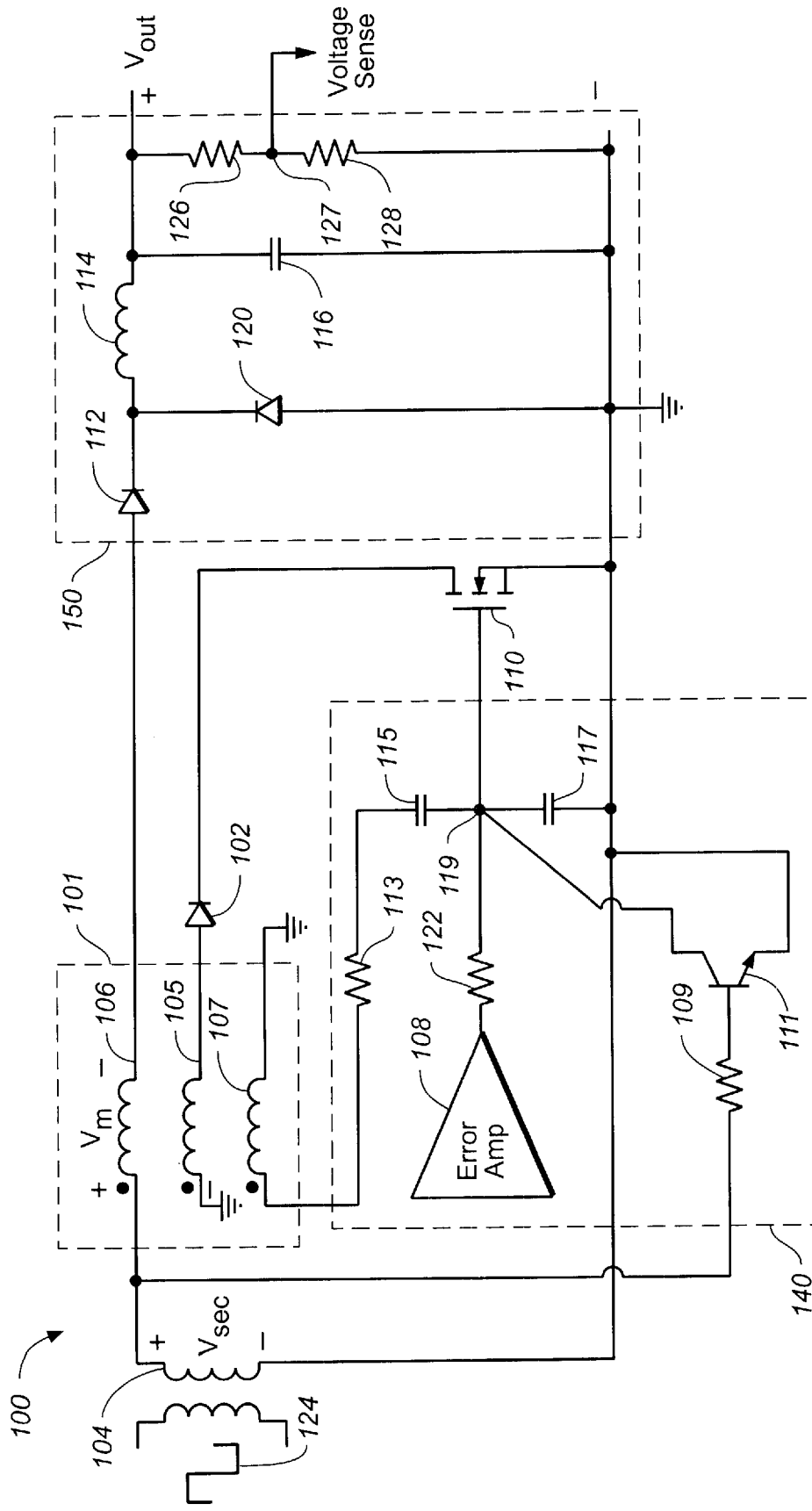
FIG._10

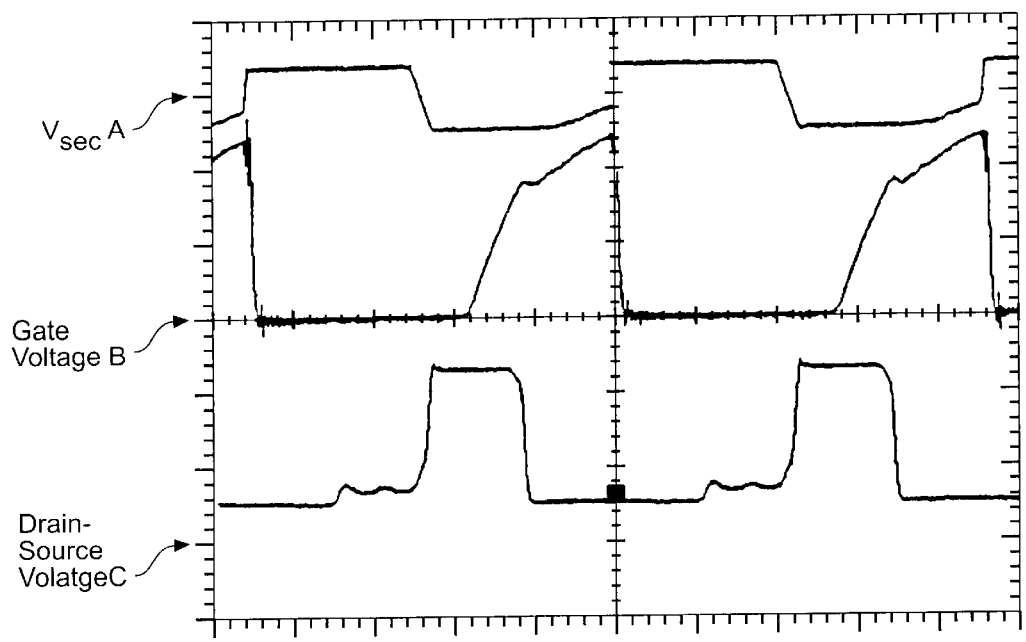
FIG._11
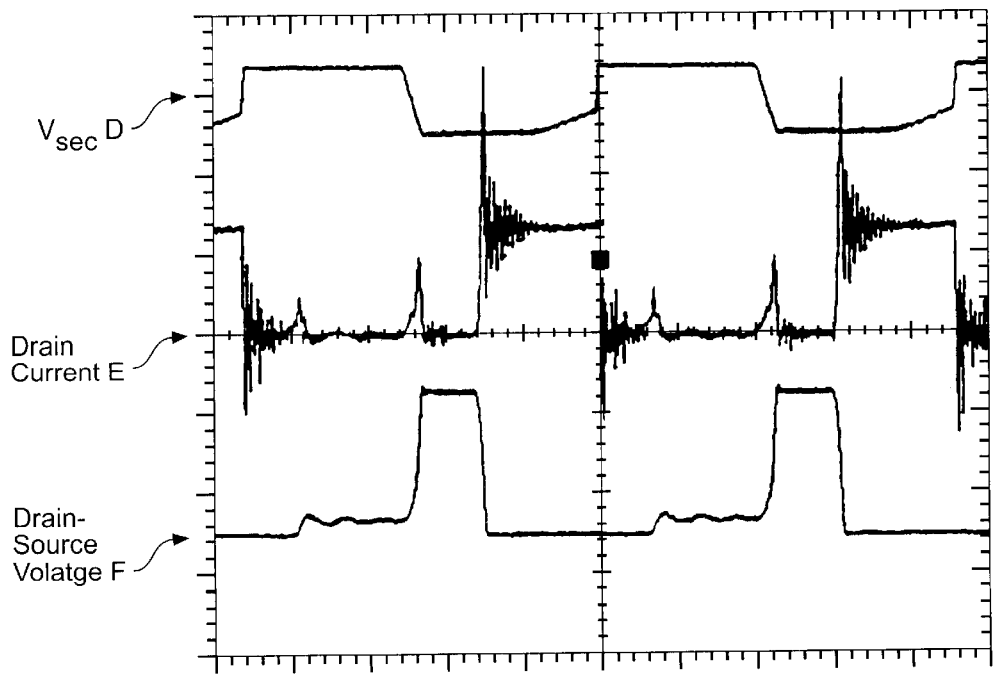
FIG._12

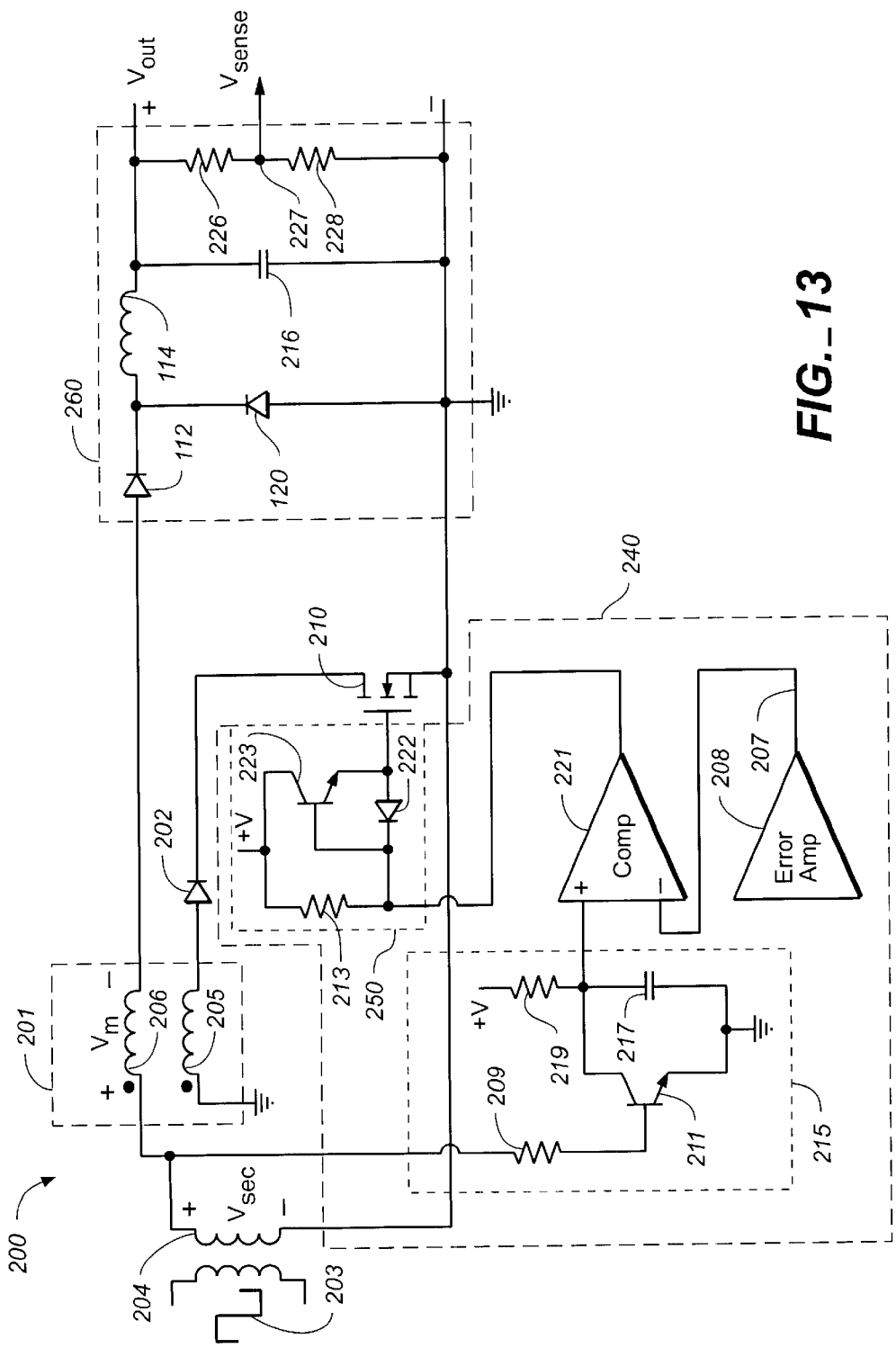
FIG._13

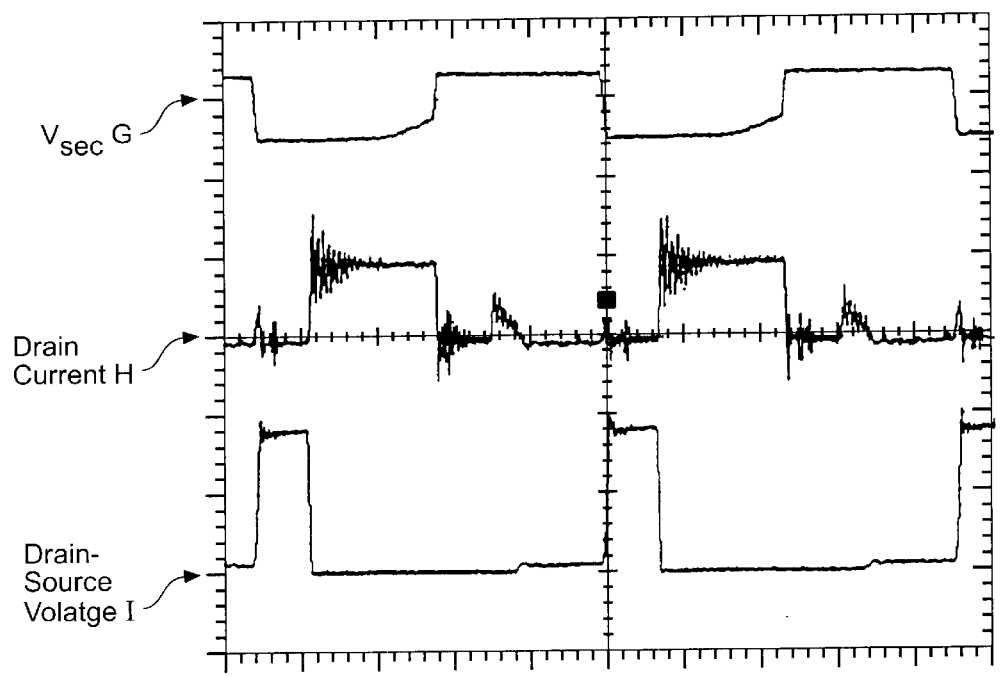
FIG._14
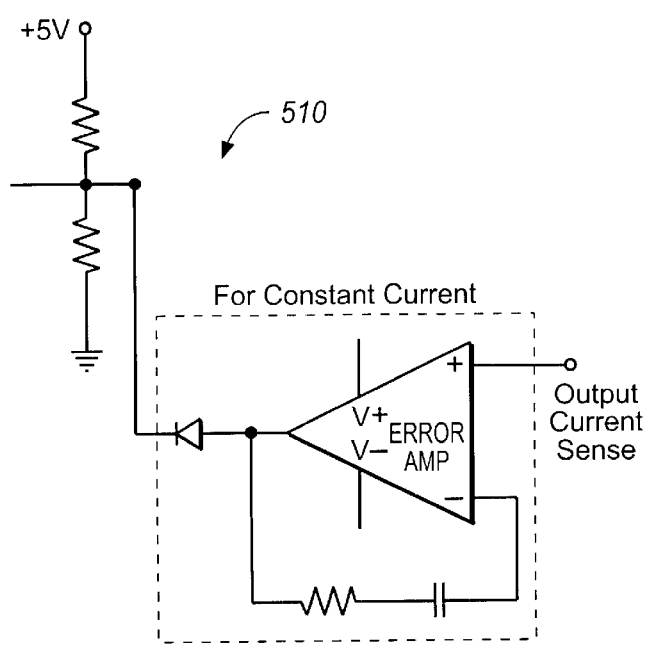
FIG._17

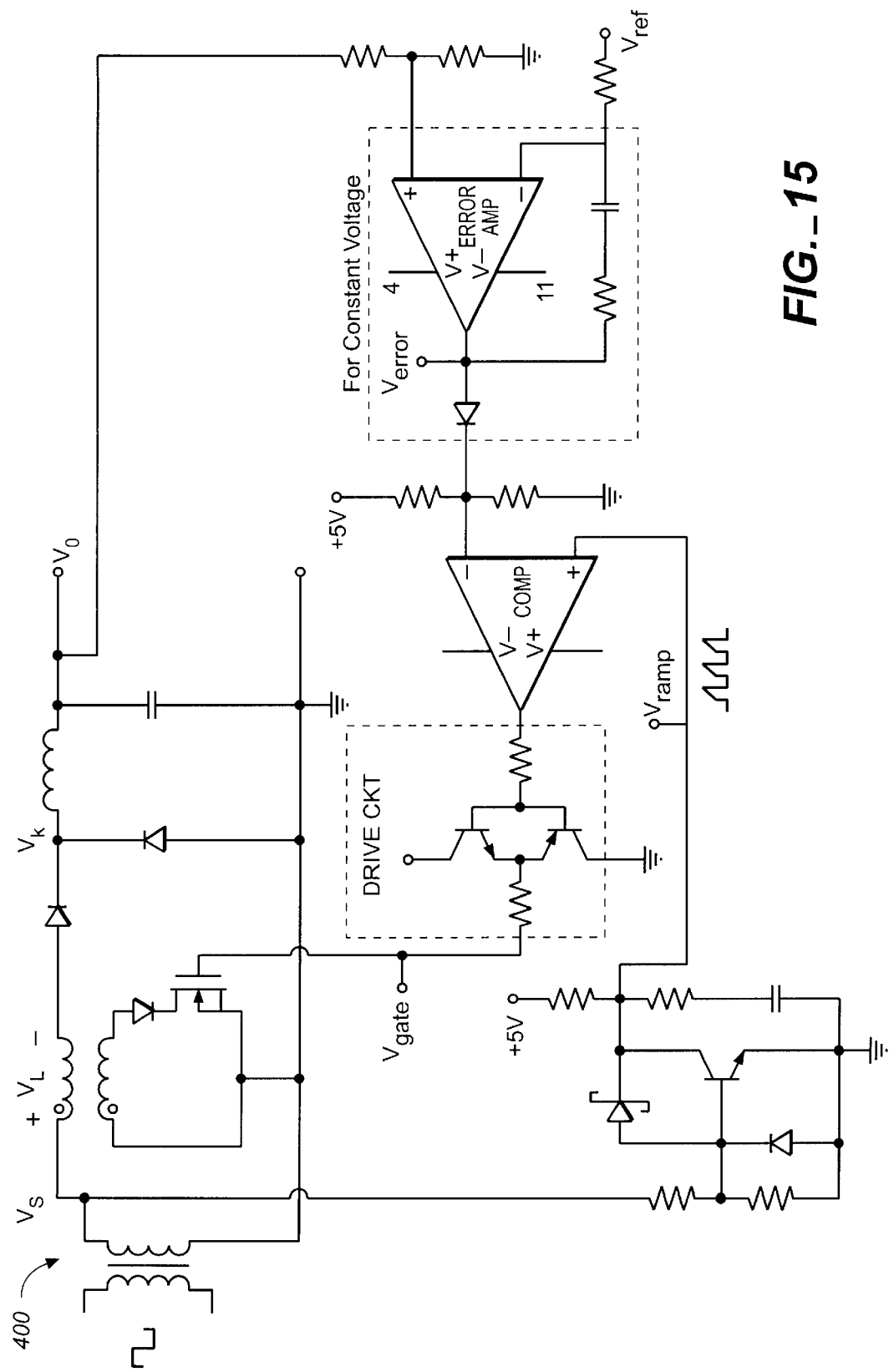
FIG._15

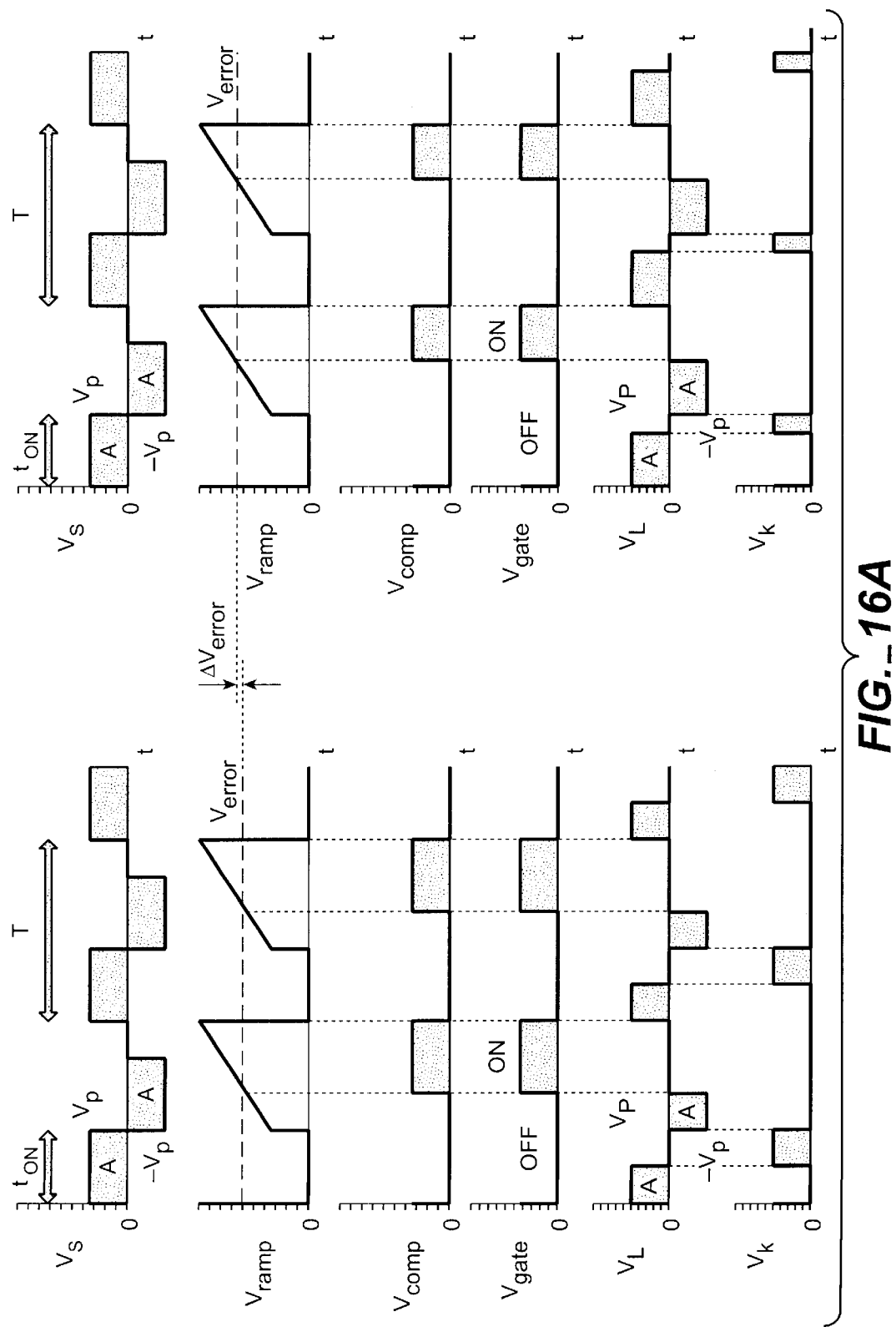
FIG._16A

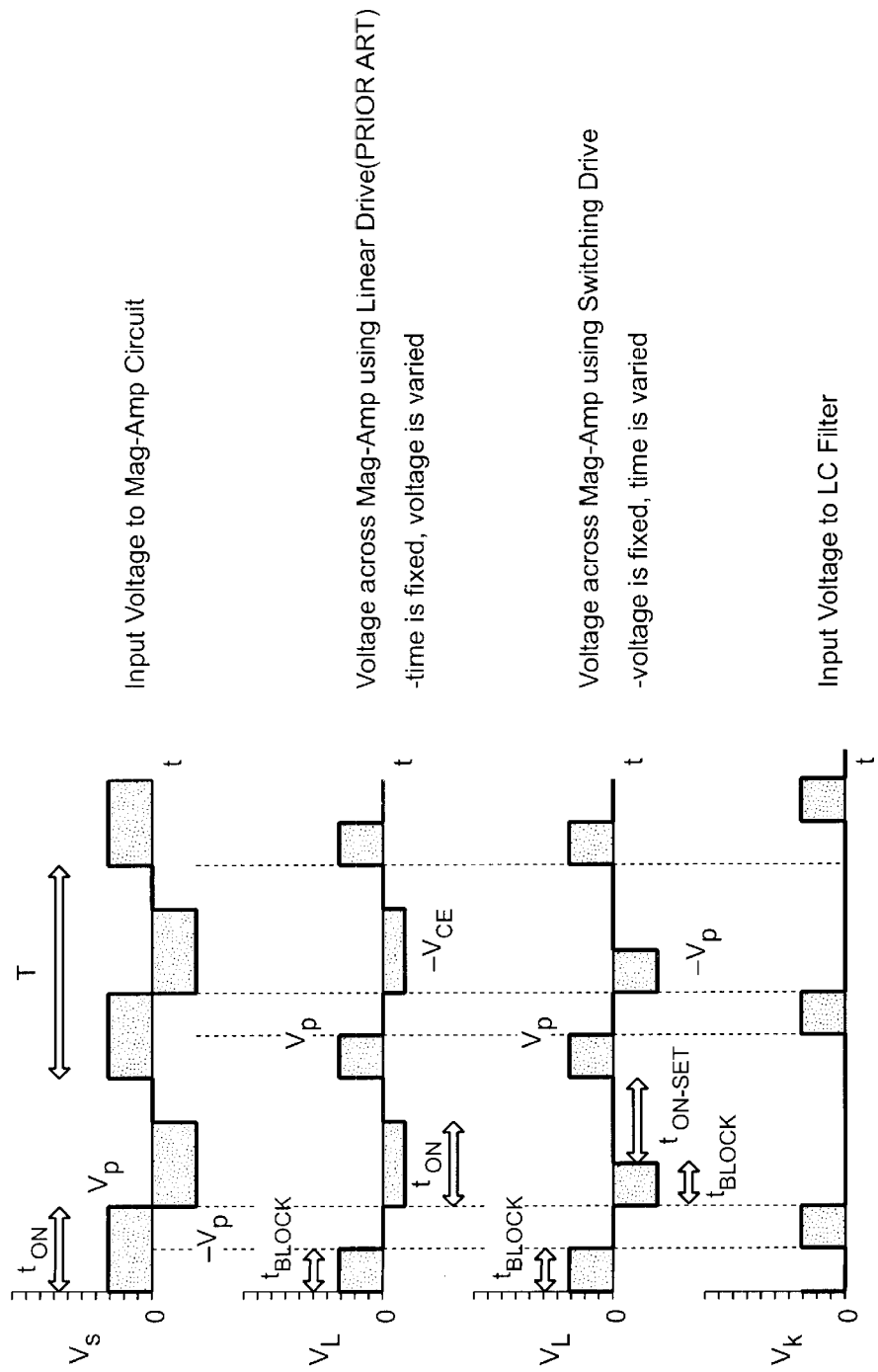
FIG._16B

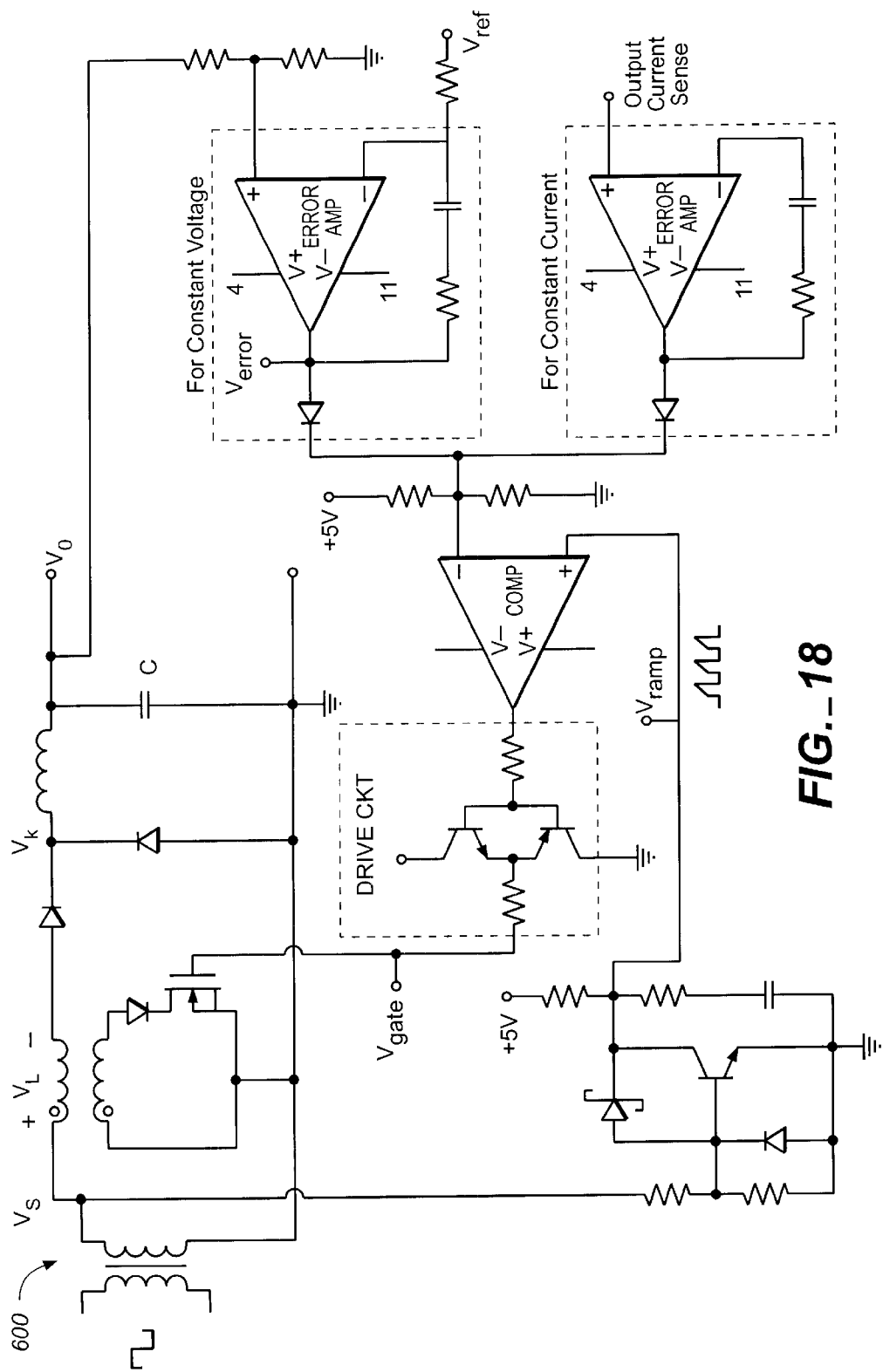
FIG._18

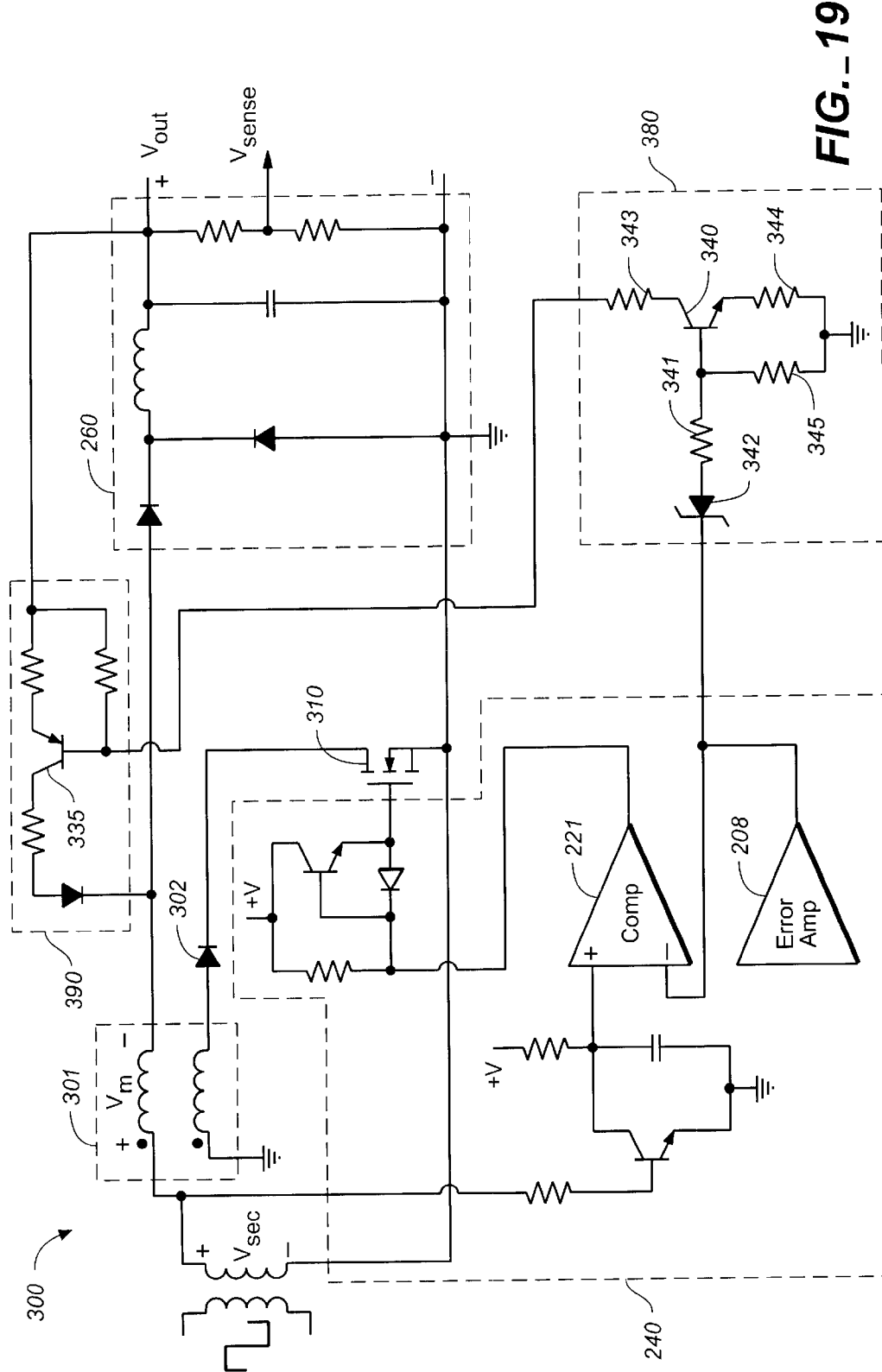
FIG._19

SWITCHED MAGAMP POST REGULATOR

FIELD OF THE INVENTION

The present invention generally relates to power converters having magnetic amplifier (magamp) post regulators and, more particularly, to circuitry used to reduce the power and efficiency loss in the control transistor of a set-mode magamp post regulator.

BACKGROUND OF THE INVENTION

The magamp post regulator is a popular power supply topology for regulating the outputs of a power converter in many applications. Modern electronic devices often require several voltage outputs; and need a low cost, energy efficient and well regulated way of providing these outputs. Magamps are typically used to provide an efficient and reliable way of providing precise voltage regulation of independent outputs of a multiple output power converter. A magamp post regulator provides improved regulation of power converter output voltage using a small control current.

The basis function of a magamp is to block a positive incoming voltage for a certain time ($t_{block}$) before allowing it to pass through an output filter. The duty cycle reduction occurs because the magamp delays the leading edge of the voltage waveform. The magamp acts to reduce the duty cycle to the rest of the circuit from the duty cycle of the incoming voltage so as to maintain the required average output voltage.

Conventional magamp post regulator circuits use a reset control to control the magamp using a control transistor operated in a linear mode. FIG. 1 illustrates a prior art example of a conventional reset-controlled magamp circuit 10. FIG. 2 illustrates the hysteresis characteristic of the core element of the magamp of the circuit of FIG. 1. The conventional magamp circuit includes a magamp 16, a diode 12, a reset transistor 20 and an error amplifier (error amp) 18. In FIG. 1, when a power switch 34 is turned on, a secondary voltage $V_{sec}$ is developed across a transformer 14 secondary winding. Magamp 16 is forced into saturation due to the action of the voltage $V_{sec}$ forced upon it. The B-H hysteresis curve in FIG. 2 shows the saturation point, $B_{saturation}$ at the top of the path. Since the magamp 16 is "in saturation", forward biased and highly conductive, current flows through the magamp to a forward output rectifier diode 22 after which it is filtered by an L-C circuit, comprised of inductor 24 and capacitor 26. The output voltage is coupled to a load, not shown, and is also divided by a voltage divider formed by series resistors 36 and 38 to generate a Voltage sense signal at node 35. At the end of the switch "on" time, the magamp 16 remains forward biased and in saturation.

When the main power switch 34 turns off and the transformer 14 voltage reverses polarity to $-V_{sec}$ the current through the magamp 16 is caused to ramp down. As a result, a vertical rectifier diode 30 must pick up the output current, causing the voltage at node 15 to drop. In this off state the magamp voltage $V_m$ is not allowed to reach zero. Instead a reset control circuitry supplies a voltage that reversely biases the magamp 16, such that the magnetic flux density is reset to a point below remanence (below the point $B_{remanence}$ of the left side of dark shaded area in FIG. 2.). Then the main switch is turned on and the transformer 14 secondary voltage becomes $+V_{sec}$. Since Magamp 16 is well below the saturation point and not conductive, it acts as an open circuit and blocks the secondary voltage. Vertical diode 30 continues to provide a path for the output current so the voltage at node 15 remains at zero. The magamp voltage Vm then equals $+V_{sec}$. In time, the voltage across magamp 16 causes it to reach saturation and become conductive. The current through the magamp rises to the output current level and remaining at this level till the end of the on time.

The flux excursion on the B-H curve of FIG. 2 depends on how much volt-time is applied across the magamp 16 during resetting. The amount of volt-seconds is controlled by the output of error amp 18. The blocking time equation is given by $$t_{block} = \frac{\Delta B \cdot turns \cdot A_{core}}{V};$$

where $A_{core}$ is the core area, $\Delta B$ is the change in flux density, turns is the number of turns for the core, and V is the voltage. It can be seen from this equation that the loop in FIG. 2 corresponding to $\Delta B2$ gives a longer blocking time that the loop of $\Delta B1$. The cores required for this prior art method of reset control exhibit a relatively square B-H curve. To lower the output voltage and increase the blocking time, the loop followed is the lightly shaded part of the B-H curve as compared to the dark part. The control circuit forces the B-H loop larger by pushing the vertical, descending part of the locus. Thus, the minimum blocking voltage-time is the locus where it just touches the vertical axis. To maximize the difference between maximum and minimum volt-time blocking, the B-H loop of the core material must have a small difference between $B_{saturation}$ and $B_{remanence}$, where it intercepts the vertical axis.

Compared to square loop amorphous core magamps, ferrite magamps are lower cost, better for high frequencies and can run at higher temperature. However, a drawback associated with this conventional reset control approach is that lower cost non-square ferrite cores perform poorly under reset control because the power dissipation at high flux excursion is too large, especially for operation at high frequency.

A prior art example of a conventional circuit for magamp post regulator control without using reset control but instead using a "set" mode with a control circuit in a linear mode, is shown in FIG. 3. This set control enables the use of lower cost ferrite cores for the magamp core, however, operation in linear mode leads to unacceptable losses in the circuit. The corresponding B-H hysteresis characteristic of the core member of the magamp of the circuit is shown in FIG. 4. For the magamp post regulator 40 in FIG. 3, an error amp 48 feeds a control transistor 50 which is operated in linear mode. When the transformer 44 secondary voltage $V_{sec}$ turns negative in response to power switch 64, a diode 42 and a control transistor 50 "catch" the current through magamp 46. Depending on the voltage output from error amp 48, the current through the loop of diode 42, control transistor 50 and magamp 46 is decreased, and the corresponding change in $\Delta H$ and $\Delta B$ is achieved (as shown in FIG. 4, the current is related to H by the equation $H*L_{core}=$ turns * I.) During the next positive cycle, the magamp 46 will block the secondary voltage $V_{sec}$ The blocking time, $T_{block}$, according to the equation described above, $$t_{block} = \frac{\Delta B \cdot turns \cdot A_{core}}{V},$$

is proportional to $\Delta B$ (turns, $A_{core}$ and V are constant for the equation). As the curve in FIG. 4 illustrates, set control mode operates only at one quadrant of the B-H curve while the reset control, as shown in FIG. 2, can operate at all four quadrants. In this "set" mode circuit, the control circuit tries to prevent the core from resetting, i.e. tries to make a smaller loop. Since there is no requirement for the core to be square, non-square less costly ferrites can be used.

FIG. 5 shows another prior art version of set control for a magamp post regulator. For this magamp post regulator circuit 70, in addition to the magamp 76 power winding, there is an extra magamp control winding 77. A driver diode 72 and a control transistor 80 control the magamp control winding 77, with the control elements isolated from the transformer 74 secondary power winding. The current through the diode 72 and control transistor 80 can be reduced depending on the turns ratio of the control winding and power winding. FIG. 6 shows a corresponding set of timing curves for the magamp set control circuit of FIG. 5. The top curve 1, is the secondary voltage and $V_p$ is the transformer 74 primary voltage, curve 2 is the $V_{error}$ voltage, curve 3 is the transistor 80 collector-emitter voltage, $V_{cc}$, and curve 4 is the magamp voltage Vm. FIG. 7 shows a set of measured voltage curve traces for the magamp set control circuit of FIG. 5. Curve 5 is the secondary voltage, curve 6 is the voltage at the anode of the horizontal diode 82 and the lower curve 7 is the magamp voltage $V_m$.

The conventional set control circuits of FIGS. 3 and 5 allow the use of lower cost non-square ferrites. A drawback of these circuits, however, is that the circuits exhibit unacceptable power and efficiency loss. FIG. 8 illustrates the unacceptable energy loss. The stored energy in the core is the area bounded by the B-H curve and the B axis. When traversing the lower part of the B-H curve up to saturation, the energy stored is equal to the light shaded area $A_e$ plus the dark shaded area $A_h$; with $A_h$ representing the energy lost due to hysteresis. When traversing the curve from saturation to the area between saturation and remanence, a part of the area $A_e$ is associated with the movement. Under set control, the energy is dissipated in the control transistor.

FIG. 9 is a set of measured trace curves illustrating the power dissipation drawback of the conventional set mode circuits. Curve 8 is the secondary voltage $V_{sec}$, curve 9 is the current for the control transistor and 10 is the control transistor voltage. The voltage and current waveforms between the vertical cursors illustrate that the power is being dissipated in the control transistor that is operating in its linear region. At higher power levels, more power will be dissipated. Under set mode control, the energy has been found to be dissipated in the control transistor that is the driver element for the magamp post regulator.

To allow the use of any kind of loop material regardless of its residual flux and to use ferrites effectively at lower frequencies, a conventional "full control" method has also been used. For this full control method, both the reset and set control methods are selectively used; with either being applied to the same core.

A drawback associated with the "set" control and the "full control" methods, as described above, is that losses in the control transistor are quite high, resulting in unacceptable reductions in power and efficiency. Parasitic energy stored in the magamp during the power delivery is burned in the control transistor. Therefore, there is a need for circuitry to reduce this power and efficiency loss in the control transistor of a set mode magamp post regulator circuit.

SUMMARY OF THE INVENTION

The aforementioned drawbacks associated with losses in the control transistor in "set" mode magamp post regulators are substantially reduced or eliminated by the present invention. One aspect of the present invention is directed to a switched set mode magamp post regulator circuit operative to eliminate the power loss associated with operation of the control transistor in linear mode, by switching the control transistor on and off synchronously with the main transformer. The switched magamp post regulator circuit enables the parasitic energy stored in the magamp to be recycled to the output load. The switched magamp circuit also reduces cost over the more commonly used reset-mode magamp circuits by employing the set mode which enables the use of different materials for the magamp core. The magamp post regulator control circuit embodiments described below are for regulating one or more output voltages of a power converter. The embodiments are described where the power converter is a forward converter, however, the present invention is equally applicable to other topologies including push-pull, half-bridge, full bridge and flyback; especially when there is a periodic rectangular voltage source similar to the $V_{sec}$ transformer secondary waveform.

One exemplary embodiment of the present invention, shown in FIG. 10, provides a set mode magamp post regulator control circuit for regulating the output voltage of a power converter. The magamp post regulator circuit comprises a magnetic amplifier, a control transistor, a set mode control circuit and an output circuit. In this embodiment the control transistor is preferably a MOSFET. A power switch signal is turned "on" a secondary voltage $V_{sec}$ is developed across the transformer winding. A set mode control circuit switches the control transistor on and off synchronously with the main transformer. A winding on the magamp is allowed to "fly" then subsequently gets shorted out, during every cycle, during the off-time for the primary of the power converter, in order to get the desired B-H excursion curve of the magamp core. When the control transistor is off, the energy from the magamp is returned to the load. When the control transistor turns on later in the cycle, current will circulate in the control windings of the magamp. The magamp preferably includes multiple magamp windings and a low-cost ferrite core.

An advantage of this embodiment is that the use of a switching mode of operation improves the power and efficiency by reducing losses in the control transistor compared to conventional circuits in which the control transistor is operated in linear mode. The set mode also allows the efficient use of lower cost core materials including ferrites.

In another exemplary embodiment of the present invention shown in FIG. 13, the switched magamp post regulator control circuit uses set mode control with a feedback control using pulse width modulation (PWM). The magamp post regulator control circuit comprises a magnetic amplifier, a control transistor, a control circuit and an output circuit. The control transistor to be switched on and off is also preferably a MOSFET. The control circuit for switching the control transistor is comprised of a comparator, an error amp and a ramp generator circuit. When the control transistor is off, the energy from the magamp is returned to the load. When the control transistor turns on later in the cycle, current will circulate in the control windings of the magamp.

FIG. 15 shows the preferred embodiment of the magamp post regulator circuit of FIG. 13. There are two main differences between FIGS. 13 and 15. One is that the ramp voltage waveform, $V_{ramp}$, produced in the embodiment in FIG. 13 is triangular whereas the ramp voltage waveform produced in FIG. 15 is trapezoidal. Secondly, for the embodiment in FIG. 15, the voltage at the negative input of the comparator passes through a diode and is DC biased. The DC bias feature incorporated into FIG. 15 is essential to ensure that the MOSFET control transistor is off during the time when the secondary voltage $V_s$ is positive even in cases wherein the output error voltage goes to its lowest possible voltage. Note that in FIG. 13 if the error amp 208 is saturated and the ramp transistor 211 is fully on, the output of the comparator 221 is unpredictable and would be dependent on which of the two voltages is larger. The trapezoidal waveform in the embodiment in FIG. 15 raises the effective error voltage needed to operate in the ramp's dynamic range. This makes the circuit more immune to false triggering. Note also that FIG. 15 easily allows the addition of another error amp circuit for constant current operation if needed. The embodiment may optionally include a drive circuit to drive the control transistor. The embodiment in FIG. 15 shows the error amp portion of the control circuit configured "for constant voltage" control.

FIG. 18 shows an alternative embodiment of FIG. 15 with an error amp circuit that provides both constant voltage and constant current control. Alternatively the constant current control, shown in FIG. 17, could be provided without the constant voltage control circuit.

An alternate embodiment of the present invention shown in FIG. 19, provides "full control" over the magamp post regulator control circuit for regulating the output voltage of a power converter. "Full control" refers to control over the full range of the hysteresis loop [from $-B_{saturation}$ to $+B_{saturation}$]. Unlike the conventional full control circuits, this embodiment uses both a set mode (switched) and reset mode (conventional linear, non-switched) depending on the operating condition. A further advantage of the full control embodiment is that it reduces core size and at the same time reduces the required number of power turns. This embodiment also allows efficient use of any kind of loop material and allows the use of lower cost ferrites at lower frequencies.

An advantage of the present invention is that it improves the operating efficiency of the power converter by minimizing the power loss associated with the control transistor element. Another advantage of the present invention is that it allows the use of lower cost ferrite cores which are lower cost than conventional amorphous cores, run better at high frequencies and can run at higher temperatures. A feature of the present invention is that it is inexpensive to manufacture since magamps have lower parts count and are easier to design than conventional post regulators.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which:

FIG. 1 is a schematic diagram of a prior art magamp post regulator using reset control;

FIG. 2 is a graph illustrating a hysteresis characteristic of the core member of the magamp of the circuit of FIG. 1;

FIG. 3 is a schematic diagram of a prior art magamp post regulator using set control instead of reset control;

FIG. 4 is a graph illustrating a hysteresis characteristic of the core member of the magamp of the circuit of FIG. 3;

FIG. 5 is a schematic diagram of a prior art magamp post regulator circuit having an extra control winding and using set control with the control transistor in linear mode;

FIG. 6 is a set of voltage timing curves for the circuit of FIG. 5,

FIG. 7 is a set of measured voltage curve traces for the magamp set control circuit of FIG. 5.

FIG. 8 is a graph illustrating the stored energy and energy loss in the core;

FIG. 9 is a set of curves illustrating the power dissipation drawback of the prior art;

FIG. 10 is a schematic diagram of an alternate embodiment of a magamp post regulator circuit of the present invention;

FIGS. 11–12 are a set of curves illustrating the operation of the circuit of FIG. 10;

FIG. 13 is a schematic diagram of an exemplary embodiment of a magamp post regulator circuit of the present invention using a comparator;

FIG. 14 is a set of curves illustrating the operation of the circuit of FIG. 13;

FIG. 15 is a schematic diagram of the preferred embodiment of the magamp post regulator circuit of FIG. 13 with constant voltage control;

FIG. 16(A) is a set of voltage curves illustrating the operation of the circuit of FIG. 15;

FIG. 16(B) is a set of voltage curves illustrating regulation timing and voltage differences between the set mode linear and the set mode switching operation;

FIG. 17 is a schematic diagram of an error amp circuit for constant current control that could be used instead of, or in addition to, the error amp constant voltage control circuit in the embodiment in FIG. 15;

FIG. 18 is a schematic diagram of an alternative embodiment of FIG. 15 with an error amp circuit that provides both constant voltage and constant current control.

FIG. 19 is a schematic diagram of an alternate embodiment of a magamp post regulator circuit of the present invention implementing full control.

DETAILED DESCRIPTION OF THE INVENTION

The switched magamp post regulator circuits according to the embodiments of the present invention allow the use of lower cost ferrite cores, at higher frequencies, while also minimizing the power loss associated with the control transistor element.

The switched magamp post regulator of the present invention will now be described with reference to FIGS. 10–19. FIG. 10 shows one embodiment of a magamp post regulator circuit 100. This embodiment comprises a magamp 101, a control transistor 110, a control circuit 140 and an output circuit 150. The control transistor 110 is operated as an on/off switch to control the set mode; and is preferably a MOSFET. The magamp includes a main magamp winding 106, with a magamp control winding 105 and an additional magamp winding 107 inductively coupled to the main magamp winding 106, preferably also provided. During the positive pulse of the transformer 104 winding, diode 102 blocks the conductive MOSFET control transistor 110 from clamping the magamp secondary control winding 105.

In order to get the desired B-H excursion curve of the magamp 101 core, the magamp control winding 105 is allowed to "fly" then subsequently gets shorted out every cycle, during the off-time of the transformer 104 primary. Power switch 124 connects in series with the transformer 104 and is coupled to an input power source (not shown). The power switch 124 alternately switches between an on period and an off period such than an ac voltage is generated across the secondary winding of transformer 104 in response. The present invention provides a control circuit 140 to accomplish the switched set mode. The control circuit 140 provides an error amp 108 and a ramp generator and drive circuitry to generate and drive a control signal to turn the control transistor 110 on and off. An error amp 108 produces an amplified error signal when a "voltage sense" from the output varies from a reference voltage (error amp input details not shown but well known in the art). The voltage sense is obtained from a node 127 tap from a voltage divider (formed by series resistors 126 and 128 across the output, and well known in the art) at the output in the output circuit 150. This error signal feeds through resistor 122 coupled to the gate of control transistor 110 at node 119. Ramp generator and drive circuitry is provided to present a ramped voltage signal at node 119. The error amp controls the amplitude of this voltage. The time when the MOSFET will turn on depends on the slope of the ramped voltage signal. Timing resistors 122 and 113 and capacitors 115 and 117 of the ramp generator and drive circuitry determine the slope of the ramped voltage signal. The ramp generator and drive circuitry further includes a transistor 111 connected to node 119, with a resistor 109 coupling the base of transistor 111 to the transformer 104 secondary.

The output circuit provided includes a forward rectifier horizontal diode 112 coupled to an LC output filter formed by an inductor 114 and a bulk capacitor 116. The LC output filter provides a substantially constant dc component flowing to the output with the ac component of the inductor 114 current flowing through the bulk capacitor 116; which has the output voltage $V_{out}$ across it. During the off state, the inductor 114 current flows through a side path provided by vertical rectifier diode 120 that prevents the forward rectifier horizontal diode 112 from becoming reverse biased during the off state.

In the conventional set mode circuit, the control transistor is operated in linear mode and not switched as for the present invention. One advantage of the present invention is overcoming the power loss and increased parasitic stored energy in the control transistor of the conventional set mode circuits. This power dissipation of the control transistor is reduced in the present invention, since when the MOSFET switch is off, the energy from the magamp is returned to the load; and when the magamp turns on later in the cycle, current will circulate in the control windings.

FIGS. 11 and 12 are sets of voltage curves illustrating the operation of the circuit of FIG. 10. In FIG. 11, as shown, the curve A represents the voltage $V_{sec}$ from transformer 104 secondary winding and curves B and C represents the gate voltage and the drain to source voltage, respectively, for MOSFET control transistor 110; with the output set to 3 volts. In FIG. 12, curve D represents $V_{sec}$, curve E is the drain current and curve F is the drain to source voltage, with the output set to 3.3 volts. From these curves, it can be seen that when the secondary voltage turns negative, the MOSFET control transistor 110 is off and turns on only when the voltage at the gate reaches its threshold level. MOSFET control transistor 110, is fully on during the remaining period of the cycle. An advantage of this embodiment compared to the conventional set mode circuit shown in FIG. 5, is the intersection of the drain to source voltage and the drain current was greatly reduced.

FIG. 13 shows the exemplary embodiment of the present invention. This embodiment shows magamp post regulator set mode circuitry for regulating the output voltage of a power converter. The magamp post regulator circuit 200 uses a Pulse Width Modulation (PWM) concept for controlling switching of the control transistor. The magamp post regulator circuit 200 comprises a magamp 201, control transistor 210, diode 202, control circuit 240 and output circuit 260. The magamp 201 preferably has a secondary magamp control winding 205 inductively coupled to the main magamp winding 206. The control circuit 240 includes a ramp generator circuit 215, an error amp 208, a comparator 221, and a drive circuit 250.

For this embodiment, the ramp generator circuit 230 is comprised of resistors 209 and 219, capacitor 217 and transistor 211. The ramp generator circuit 215 is controlled to produce a ramped voltage signal during the off time of the transformer 204. Power switch 203 connects in series with the transformer 204 and is coupled to an input power source (not shown). The power switch 203 alternately switches between an on period and an off period such than an ac voltage is generated across the secondary winding of transformer 204 in response. An error amp 208 produces an amplified error signal 207 when the voltage sense ($V_{sense}$) tapped at node 227 from a voltage divider, formed by series resistors 226 and 228 across the output in output circuit 260, varies from a reference voltage (details not shown but well known in the art). A comparator 221 compares the ramped voltage signal with the error signal 207 from the error amp 208. The comparator 221 provides a signal whenever the error signal 207 is less than the magnitude of the ramped voltage signal from the ramp generator circuit 215. The control transistor 210 is preferably a MOSFET. The signal from comparator 221 feeds a drive circuit 250, formed by resistor 213, transistor 223 and diode 222, which drives the gate of the MOSFET control transistor 210, switching the MOSFET control transistor 210 on to the conducting state. During the positive pulse of the transformer 204 winding, however, diode 202 blocks the conductive control transistor 210 from clamping the magamp secondary control winding 205.

This embodiment has the advantage of further reducing the power dissipation (and the device temperature) for the control transistor 210. The magamp 201 stored parasitic energy is returned instead to a bulk capacitor 216 until the desired volt-seconds part of the duty cycle is reached. At that point, the conductive control transistor 210 clamps the magamp secondary control winding 205 to set the magamp 201 core and keep the core at the desired point in the B-H loop.

FIG. 14 is a set of curves illustrating the operation of the circuit of FIG. 13. Curve G represents the voltage $V_{sec}$ from the transformer 204 secondary winding. Curves H and I represents the drain current and drain to source voltage, respectively, for the MOSFET control transistor 210. From these curves, it can be seen that at the minimum blocking state, when the secondary voltage $V_{sec}$ turns negative, the MOSFET control transistor 210 is off(no drain current in curve H). The drain current pulses in curve H occur during the interval, described above, when the ramped voltage signal rises above the error signal 207 threshold causing the comparator 221 to provides a signal that turns MOSFET control transistor 210 on to the conductive state.

FIG. 15 shows a schematic diagram of the preferred embodiment of the magamp post regulator circuit in FIG. 13. As can be seen from the figure, the magamp post regulator circuit 400 in FIG. 15 shows additional circuit details and an optional different drive circuit (drive ckt), a different error amp circuit (for constant voltage) and a different ramp generator circuit (using a zener diode) than that shown in FIG. 13. FIG. 16(A) shows voltage and timing curves illustrating the operation of the circuit of FIG. 15.

FIG. 16(B) is a set of voltage and timing curves to show the difference in regulation voltage and timing for the set mode using switching versus the linear operation.

FIG. 17 shows an alternative error amp circuit 510 "for constant current" control using an output current sense. FIG. 18 shows a magamp post regulator circuit 600 that is an alternative embodiment of FIG. 15 using an error amp circuit that provides both constant voltage control and constant current control circuitry. Alternatively the constant current control circuit as shown in FIG. 17 could be provided without the constant voltage control circuit.

FIG. 19 shows an alternate embodiment of the switched magamp post regulator of the present invention that implements a "full control" over the range of the hysteresis loop in regulating the output voltage of a power converter. In addition to the advantage of improved efficiency and substantial reduction in the power loss in the control transistor, magamp core size is reduced along with a reduction in the required number of power turns. This embodiment also allows efficient use of any kind of loop material and allows the use of lower cost ferrites at lower frequencies. This alternate embodiment of the switched magamp post regulator uses both set mode and reset mode control, depending on the operating conditions of the converter. The set mode part of the circuit uses the inventive switching aspect; while for the reset mode part, the control transistor is operated in the conventional non-switching linear because switching yields no advantage for the reset mode.

The switched magamp post regulator circuit 300 of FIG. 19 is comprised of a magamp 301, a diode 302, a set mode control circuit 240, a reset mode control circuit 390, a mode arbitrator circuit 380 and an output circuit 260. The set mode control circuit 240 is as described for the set mode embodiment in FIG. 13. The reset control circuit 390 and mode arbitrator circuit 380, however, are unique to the "full control" embodiment of FIG. 19, and thus, will be described in more detail.

The reset control circuit 390 operates a reset mode control transistor 335 in a conventional linear (non-switched) mode. This circuit controls the amount of current through magamp 301 when the magamp 301 core is driven beyond remanence. Since the magamp 301 core can be driven beyond remanence, a higher flux is achieved. Applying the equation for blocking time that is found on FIG. 4, $$t_{block} = \frac{\Delta B \cdot turns \cdot A_{core}}{V},$$

indicates that even with a smaller number of turns and a smaller core area, $A_{core}$, the necessary blocking time of the magamp 301 can still be achieved since the change in flux density, $\Delta B$, can be made larger.

For this full control operation of this embodiment, however, the set and reset modes are never applied at the same time. Thus, set mode control transistor 310, preferably a MOSFET, and reset mode control transistor 335 are never on simultaneously in this embodiment. The mode arbitrator circuit 380 which provides this control of the two modes includes a transistor 340, coupled to the base of reset mode transistor 335 through a resistor 343, additional resistors 341, 344 and 345; and a zener diode 342, coupled to an connection between the error amp 208 and comparator 221 of the control circuit 240.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching. Accordingly, the scope of the present invention is to be defined by the claims appended hereto.

What is claimed is:

1. A switched magamp post regulator circuit for regulating an output voltage of a power converter having a transformer for transforming a voltage to the switched magamp post regulator circuit under power switch control, the switched magamp post regulator comprising:

a magamp that comprises a core, a main magamp winding and one or more additional magamp windings inductively coupled to the main magamp winding;

a diode connected to one of the magamp windings, to block control of the magamp winding during the positive pulse of the transformer;

a control transistor operated as a switch in a non-linear mode, operative to set the core;

a control circuit including circuitry for generating a control signal to switch the control transistor;

an output circuit operative to condition the output voltage.

2. The switched magamp post regulator circuit of claim 1, wherein the control circuit includes an error amp, operative to provide an error voltage signal when a voltage sense tapped from the output differs from a reference voltage.

3. The switched magamp post regulator circuit of claim 1, wherein the control circuit includes a drive circuit to provide drive for the control transistor.

4. The switched magamp post regulator circuit of claim 2, wherein the control circuit further includes a ramp generator circuit, to produce a ramped voltage signal during the off time of the transformer.

5. The switched magamp post regulator circuit of claim 3, wherein the control circuit further includes a comparator.

6. The switched magamp post regulator circuit of claim 4, wherein the control circuit further includes a reset control circuit to provide reset control of the magamp, and a mode arbitrator circuit to ensure that set control and reset control never occur simultaneously.

7. The switched magamp post regulator circuit of claim 1, wherein the control transistor is a MOSFET operated as an on/off switch.

8. The switched magamp post regulator circuit of claim 1, wherein the magamp core is a ferrite core.

9. The switched magamp post regulator circuit of claim 1, wherein the output circuit comprises:

an output filter operative to provide a substantially constant dc voltage to an output load, a forward rectifier operative to provide a forward conduction path between the magamp output and the output filter;

a vertical rectifier operative to provide a secondary side current path.

10. A switched magamp post regulator circuit for regulating an output voltage of a power converter having a transformer for transforming a voltage to the switched magamp post regulator circuit under power switch control, the switched magamp post regulator comprising:

a magamp that comprises a core, a main magamp winding and two or more additional magamp control windings inductively coupled to the main magamp winding;

a control transistor operated as a switch in a non-linear mode, operative to set the core;

a diode connected to one of the magamp windings, to block control of the magamp winding during the positive pulse of the transformer;

a control circuit for generating a control signal to switch the set control transistor, comprising:
- an error amp operative to provide an error voltage signal when a voltage sense tapped from the output differs from a reference voltage;
- a ramp generator circuit, to produce a ramped voltage signal during the off time of the transformer;

an output circuit operative to condition the output voltage, comprising:
- an output filter operative to provide a substantially constant dc voltage to a an output load;
- a forward rectifier operative to provide a forward conduction path between the magamp output and the output filter;
- a vertical rectifier operative to provide a secondary side current path.

11. The switched magamp post regulator circuit of claim 10, wherein the control transistor is a MOSFET operated as an on/off switch.

12. The switched magamp post regulator circuit of claim 10, wherein the magamp core is a ferrite core.

13. The switched magamp post regulator circuit of claim 10, wherein the control circuit includes a drive circuit to provide drive for the control transistor.

14. A switched magamp post regulator circuit for regulating an output voltage of a power converter having a transformer for transforming a voltage to the switched magamp post regulator circuit under power switch control, comprising:
- a magamp that comprises a core, a main magamp winding and an additional magamp winding inductively coupled to the main magamp winding;
- a control transistor operated as a switch in a non-linear mode; the control transistor operative to set the core;
- a diode connected to one of the magamp windings, to block control of the magamp winding during the positive pulse of the transformer;
- a control circuit for generating a control signal to switch the control transistor, comprising:
  - an error amp operative to provide an error voltage signal when a voltage sense tapped from the output differs from a reference voltage;
  - a ramp generator circuit, to produce a ramped voltage signal during the off time of the transformer;
  - a comparator that compares the error voltage signal with the magnitude of the ramped voltage signal to provide a signal to switch on the control transistor;
- an output circuit operative to condition the output voltage, comprising:
  - an output filter operative to provide a substantially constant dc voltage to a an output load;
  - a forward rectifier operative to provide a forward conduction path between the magamp output and the output filter;
  - a vertical rectifier operative to provide a secondary side current path.

15. The switched magamp post regulator circuit of claim 14, wherein the control transistor is a MOSFET operated as an on/off switch.

16. The switched magamp post regulator circuit of claim 14, wherein the magamp core is a low-cost ferrite core.

17. The switched magamp post regulator circuit of claim 14, wherein the control circuit includes a drive circuit to provide drive for the control transistor.

18. The switched magamp post regulator circuit of claim 14, further comprising a second error amp operative to provide an error current signal when a current sensed at the output of the converter differs from a predetermined reference current, wherein the error current signal is coupled to the comparator such that the magnitude of the ramped voltage signal is compared to both the error voltage signal and the error current signal to provide the control signal to switch on the control transistor.

19. The switched magamp post regulator circuit of claim 14, further comprising a second diode coupled in series between the error amp and the comparator, the second diode having an anode connected to the error amp and a cathode connected to a first node, the comparator having a positive input and a negative input, and wherein the ramp generator signal is coupled to the positive input and the first node is coupled to the negative input, the second diode coupling the error voltage signal to the negative input of the comparator.

20. The switched magamp post regulator circuit of claim 19, further comprising a dc bias circuit comprising a first resistor and second resistor connected in series between a predetermined dc voltage and ground, the junction of the first resistor and second resistor connected to the first node, the dc bias circuit operative to bias the error voltage signal at the negative input of the comparator at the first node such that the control transistor is held in an off state when the transformed voltage is positive.

21. A switched magamp post regulator circuit for regulating an output voltage of a power converter having a transformer for transforming a voltage to the switched magamp post regulator circuit under power switch control, the switched magamp post regulator comprising:
- a magamp that comprises a core, a main magamp winding and one or more additional magamp control windings inductively coupled to the main magamp winding;
- a diode connected to one of the magamp windings, to block control of the magamp winding during the positive pulse of the transformer;
- a set control transistor operated as an on/off switch in a non-linear mode; wherein the set control transistor operative to set the core;
- a control circuit comprising:
  - a set mode control circuit for generating a control signal to switch the set control transistor; comprising:
    - an error amp operative to provide an error voltage signal when a voltage sense tapped from the output differs from a reference voltage;
    - a ramp generator circuit, to produce a ramped voltage signal during the off time of the transformer;
    - a comparator that compares the error voltage signal with the magnitude of the ramped voltage signal to provide a signal to switch on the control transistor;
  - a reset control transistor operative to reset the magamp core;
  - a reset control circuit to operate the reset control transistor in a linear non-switching mode;
  - a mode arbitrator circuit to ensure that set control and reset control never occur simultaneously;
- an output circuit operative to condition the output voltage, comprising:
  - an output filter operative to provide a substantially constant dc voltage to a an output load;
  - a forward rectifier operative to provide a forward conduction path between the magamp output and the output filter;
  - a vertical rectifier operative to provide a secondary side current path.

22. The switched magamp post regulator circuit of claim 21, wherein the set control transistor is a MOSFET operated as an on/off switch.

23. The switched magamp post regulator circuit of claim 21, wherein the magamp core is a ferrite core.

24. The switched magamp post regulator circuit of claim 21, wherein the control circuit includes a drive circuit to provide drive for the control transistor.

25. A power converter comprising:
- an isolating power transformer having a primary winding and one or more secondary windings;
- one or more power switches in series with the transformer and coupled to an input power source, the one or more power switches capable of being alternately switched between an on period and an off period such than an ac voltage is generated across the one or more secondary windings in response thereto;
- a switched magamp post regulator circuit coupled between the secondary winding and an output load to regulate the output load, the switched magamp post regulator circuit comprising:
  - a magamp that comprises a core, a main magamp winding and one or more additional magamp windings inductively coupled to the main magamp winding;
  - a set control transistor operated as a switch in a non-linear mode; the control transistor operative to set the core and to prevent it from resetting;
  - a set control circuit including circuitry for generating a control signal to switch the set control transistor;
  - an output circuit operative to condition the output voltage.

26. The power converter of claim 25 having one or more outputs, and one or more switched magamp post regulator circuits.

27. The power converter of claim 25 further comprising:
- a reset control transistor operative to reset the magamp core;
- a reset control circuit to operate the reset control transistor in a linear non-switching mode;
- a mode arbitrator circuit to ensure that set control and reset control never occur simultaneously.

28. A switched magamp post regulator circuit for regulating an output voltage of a power converter having a transformer for transforming a voltage to the switched magamp post regulator circuit under power switch control, comprising:

- a magamp that comprises a core, a main magamp winding and an additional magamp winding inductively coupled to the main magamp winding;
- a control transistor operated as a switch in a non-linear mode; the control transistor operative to set the core;
- a diode connected to one of the magamp windings, to block control of the magamp winding during the positive pulse of the transformer;
- a control circuit for generating a control signal to switch the control transistor, comprising:
  - an error amp operative to provide an error signal based on the output of the converter;
  - a ramp generator circuit, to produce a ramped voltage signal during the off time of the transformer;
  - a second diode coupled in series between the error amp and a first node, the second diode having an anode connected to the error amp and a cathode connected to the first node;
  - a comparator having a positive input and a negative input, the ramp generator signal connected to the positive input and the first node coupled to the negative input such that the second diode couples the error signal to the negative input of the comparator, the comparator comparing the error signal with the magnitude of the ramped voltage signal to provide a signal to switch on the control transistor;
  - a dc bias circuit comprising a first resistor and second resistor connected in series between a predetermined dc voltage and ground, the junction of the first resistor and second resistor connected to the first node, the dc bias circuit operative to bias the error voltage signal at the negative input of the comparator at the first node such that the control transistor is held in an off state when the transformed voltage is positive;
- an output circuit operative to condition the output voltage, comprising:
  - an output filter operative to provide a substantially constant dc voltage to a an output load;
  - a forward rectifier operative to provide a forward conduction path between the magamp output and the output filter; and
  - a vertical rectifier operative to provide a secondary side current path.

* * * * *